(12) United States Patent
Gupta et al.

(10) Patent No.: US 12,535,091 B2
(45) Date of Patent: Jan. 27, 2026

(54) PROGNOSTICS IN HYDRAULIC TRANSMISSION SYSTEM USING E-MACHINE DRIVE

(71) Applicant: Deere & Company, Moline, IL (US)

(72) Inventors: Subhabrata Gupta, Pune (IN); Sourabha Gokhale, Pune (IN)

(73) Assignee: DEERE & COMPANY, Moline, IL (US)

( * ) Notice: Subject to any disclaimer, the term of this patent is extended or adjusted under 35 U.S.C. 154(b) by 96 days.

(21) Appl. No.: 18/303,874

(22) Filed: Apr. 20, 2023

(65) Prior Publication Data

US 2024/0352953 A1 Oct. 24, 2024

(51) Int. Cl.
*F15B 19/00* (2006.01)
*F15B 21/041* (2019.01)
*G01N 33/28* (2006.01)
*F01M 11/10* (2006.01)

(52) U.S. Cl.
CPC .......... *F15B 19/002* (2013.01); *F15B 21/041* (2013.01); *G01N 33/2888* (2013.01); *F01M 2011/14* (2013.01); *F01M 2011/148* (2013.01); *F16N 2200/12* (2013.01); *F16N 2260/18* (2013.01)

(58) Field of Classification Search
CPC . F15B 19/002; F15B 21/041; G01N 33/2888; F01M 2011/14; F01M 2011/148; F16N 2200/12; F16N 2260/18
See application file for complete search history.

(56) References Cited

U.S. PATENT DOCUMENTS

| 4,796,204 A * | 1/1989 | Inoue ..................... G07C 5/006 |
| | | 123/196 S |
| 6,912,479 B2 * | 6/2005 | Ryu ....................... G01N 21/94 |
| | | 702/183 |
| 6,965,212 B1 * | 11/2005 | Wang ..................... H02P 21/06 |
| | | 318/700 |
| 10,060,899 B2 | 8/2018 | Hegazi et al. |
| 10,132,744 B2 | 11/2018 | Shinoda |
| 10,520,384 B2 | 12/2019 | Adeeb |
| 10,521,980 B2 | 12/2019 | Soh |

(Continued)

FOREIGN PATENT DOCUMENTS

| CN | 203011689 U | 6/2013 |
| DE | 102016214128 A1 * | 8/2017 |

(Continued)

OTHER PUBLICATIONS

English translation of DE-102016214128-A1 (Year: 2017).*

(Continued)

*Primary Examiner* — Dominick L Plakkoottam
(74) *Attorney, Agent, or Firm* — Harness, Dickey & Pierce, P.L.C.

(57) ABSTRACT

A device for determining fluid degradation includes a memory and processing circuitry configured to cause the device to generate first calibration data of an e-machine at a first time, generate second calibration data of the e-machine at a second time subsequent to the first time, and determine that the fluid is degraded in response to a difference between the first calibration data and the second calibration data being greater than or equal to a degradation threshold.

19 Claims, 5 Drawing Sheets

(56) References Cited

U.S. PATENT DOCUMENTS

| | | | |
|---|---|---|---|
| 11,014,454 B2 | 5/2021 | Bindl et al. | |
| 2003/0005751 A1* | 1/2003 | Berndorfer | G01N 33/2888 73/54.01 |
| 2005/0131599 A1* | 6/2005 | Inagawa | G01N 33/2888 701/51 |
| 2007/0186632 A1 | 8/2007 | Endo et al. | |
| 2008/0139360 A1* | 6/2008 | Hayashi | F16H 3/725 477/3 |
| 2009/0217740 A1* | 9/2009 | Nedachi | G01N 33/2888 116/28 R |
| 2016/0209314 A1 | 7/2016 | Nesland, Sr. et al. | |
| 2021/0025132 A1 | 1/2021 | Ishii et al. | |
| 2022/0266905 A1 | 8/2022 | Krone et al. | |

FOREIGN PATENT DOCUMENTS

| | | |
|---|---|---|
| EP | 3098450 B1 | 6/2019 |
| WO | WO 2013088841 A1 | 6/2013 |

OTHER PUBLICATIONS

Y. Liu et al. 'A new evaluation method on hydraulic system using the instantaneous speed fluctuation of hydraulic motor' Proc IMechE Part C: *Journal of Mechanical Engineering Science*, 0(0), https://www.researchgate.net/publication/318762486_A_new_evaluation_method_on_hydraulic_system_using_the_instantaneous_speed_fluctuation_of_hydraulic_motor pp. 1-11.

Huiting Ni et al, "Research on Fault Diagnosis of PST Electro-Hydraulic Control System of Heavy Tractor Based on Support Vector Machine" Processes 2022, 10, 791. https://doi.org/10.3390/pr10040791.

Juying Dai et al., "Signal-Based Intelligent Hydraulic Fault Diagnosis Methods: Review and Prospects" *Chin. J. Mech. Eng.* (2019) 32:75 https://doi.org/10.1186/s10033-019-0388-9.

Jiaoyi Hou et al. "Fault diagnosis of synchronous hydraulic motor based on acoustic signals" Advances in Mechanical Engineering 2020, vol. 12(4) 1-11.

Extended European Search Report and Written Opinion issued in European Patent Application No. 24158702.1 dated Jul. 12, 2024, in 09 pages.

* cited by examiner

PROGNOSTICS IN HYDRAULIC TRANSMISSION SYSTEM USING E-MACHINE DRIVE

BACKGROUND

Hydraulic systems are dominant in off-highway applications. However, leakage due to high pressure and mechanical design in hydraulic systems may reduce uptime and productivity. Use of electronic machines (e-machines), for example, an electronic motor, has been proposed to reduce the leakage.

SUMMARY

Some example embodiments include a hydraulic system for determining a degradation of hydraulic fluid.

At least one example embodiment provides a device for determining fluid degradation, the device including a memory and processing circuitry configured to cause the device to generate first calibration data of an electronic machine (e-machine) at a first time, generate second calibration data of the e-machine at a second time subsequent to the first time, and determine that the fluid is degraded in response to a difference between the first calibration data and the second calibration data being greater than or equal to a degradation threshold.

At least one example embodiment provides a system for determining fluid degradation, the system including a hydraulic pump, an electronic machine (e-machine) configured to drive the hydraulic pump, and processing circuitry configured to cause the system to generate first calibration data of an e-machine at a first time, generate second calibration data of the e-machine at a second time subsequent to the first time, and determine that the fluid is degraded in response to a difference between the first calibration data and the second calibration data being greater than or equal to a degradation threshold.

At least one example embodiment provides a method for determining fluid degradation of a hydraulic system, the method including generating first calibration data of an electronic machine (e-machine) at a first time, generating second calibration data of the e-machine at a second time subsequent to the first time, and determining that the fluid is degraded in response to a difference between the first calibration data and the second calibration data being greater than or equal to a degradation threshold.

At least one example embodiment provides a device for determining fluid degradation, the device including a means for generating first calibration data of an electronic machine (e-machine) at a first time, a means for generating second calibration data of the e-machine at a second time subsequent to the first time, and a means for determining that the fluid is degraded in response to a difference between the first calibration data and the second calibration data being greater than or equal to a degradation threshold.

At least one example embodiment provides a non-transitory computer readable storage medium storing computer executable instructions that, when executed, cause a device to perform a method for determining fluid degradation of a hydraulic system, the method including generating first calibration data of an electronic machine (e-machine) at a first time, generating second calibration data of the e-machine at a second time subsequent to the first time, and determining that the fluid is degraded in response to a difference between the first calibration data and the second calibration data being greater than or equal to a degradation threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In some example embodiments a hydraulic system may be configured to determine a degradation and/or a leakage of a fluid in the hydraulic system.

At least one example embodiment provides a device for determining fluid degradation, the device including a memory and processing circuitry configured to cause the device to generate first calibration data of an electronic machine (e-machine) at a first time, generate second calibration data of the e-machine at a second time subsequent to the first time, and determine that the fluid is degraded in response to a difference between the first calibration data and the second calibration data being greater than or equal to a degradation threshold.

The processing circuitry may be further configured to cause the device to generate the first calibration data based on at least one of a first current profile of the e-machine or a first torque profile of the e-machine at the first time, and generate the second calibration data based on at least one of a second current profile of the e-machine or a second torque profile of the e-machine at the second time.

The processing circuitry may be further configured to cause the device to generate the first calibration data and the second calibration data based on internal readings of the e-machine.

The processing circuitry may be further configured to cause the device to generate the first calibration data and the second calibration data without a sensor external to the e-machine.

The processing circuitry may be further configured to cause the device to generate third calibration data of the e-machine, determine whether the third calibration data is within a tolerance threshold of the first calibration data, and delete the first calibration data and re-generate the first calibration data in response to determining that the third calibration data is not within the tolerance threshold of the first calibration data.

The processing circuitry may be further configured to cause the device to generate the third calibration data based on at least one of a third current profile of the e-machine or a third torque profile of the e-machine.

The processing circuitry may be further configured to cause the device to determine that there is a leakage in response to the difference between the first calibration data and the second calibration data being outside of the degradation threshold.

Figure 1:
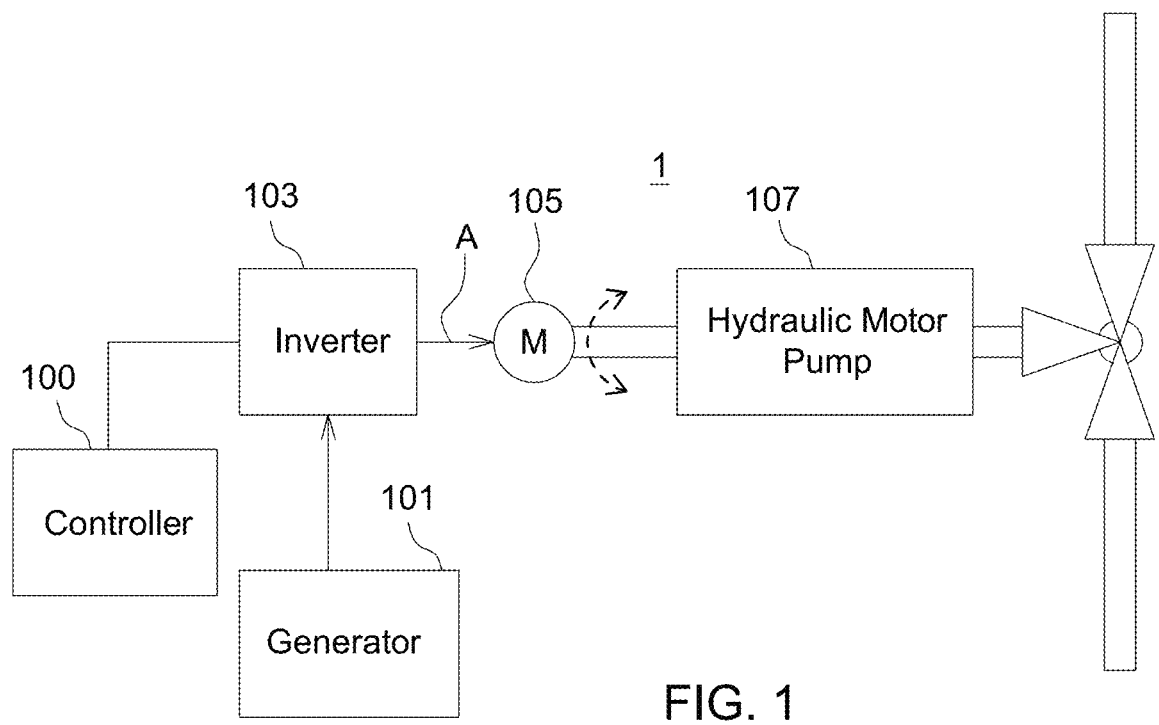
FIG. 1 is a functional block diagram of a hydraulic system according to example embodiments.

FIG. 1 is a functional block diagram of a hydraulic system according to example embodiments.

Referring to FIG. 1, a hydraulic system 1 according to example embodiments may include a controller 100, a generator 101, an inverter 103, an electronic machine (e-machine) 105, and/or a hydraulic motor pump 107.

The generator 101 generates and provides DC (direct current) electrical power to the inverter 103. The inverter 103 converts the DC electrical power from the generator into AC electrical power of a particular voltage and outputs the AC electrical power to an electrical bus A for use. The e-machine 105 (e.g., an electric motor) is also coupled to the electrical bus A and draws electrical power from the electrical bus A to power the operation of the e-machine 105. The mechanical power generated by the e-machine 105 is applied to hydraulic motor pump 107 that is mechanically coupled to the e-machine 105. For example, the e-machine 105 may be configured to operate at a specific torque profile for a given application.

The hydraulic motor pump 107 may be configured to drive a motor (not shown) that is rotationally coupled to hydraulic system 1.

In some other example embodiments, the generator 101 is provided as an electric machine without commutators, which produces an AC output. The inverter 103 in such implementations is configured as a rectifier to rectify the AC output of the generator. In various implementations, the AC output of the generator 101 might be rectified by a passive or active rectifier. Active rectifiers are commonly referred to as "inverters." Accordingly, in the example illustrated in FIG. 1 and in the other examples below, the phrase "inverter" is used to refer to either (a) an inverter that converts a DC output from a generator into an AC output or (b) an active rectifier that rectifies an AC output of a generator. Furthermore, to the extent that the examples described herein refer specifically to a generator that provides a DC output to an inverter, it is to be understood that the specific configurations and schematic examples described herein could be extended to alternative implementations that include a generator that produces an AC output that is provided to an active rectifier (e.g., an "inverter") for rectification.

The controller 100 may be configured to control an operation of the inverter. The controller 100 may be further configured to determine a presence of damage or leakage in the hydraulic system 1 as sign of electromagnetic torque variation at the e-machine shaft, as well gradual decline in calibration values over time to provide degradation in quality of hydraulic oil.

Figure 2:
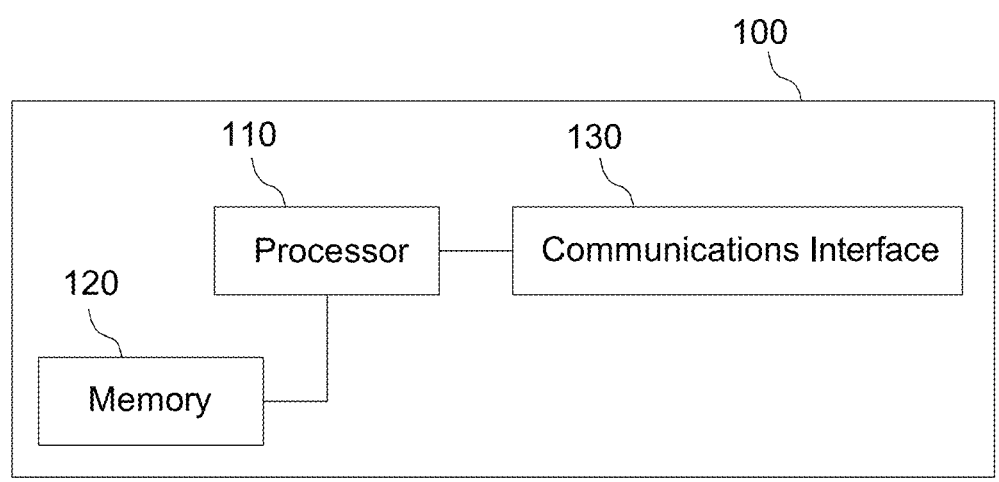
FIG. 2 is a functional block diagram of the controller according to example embodiments.

FIG. 2 is a functional block diagram of the controller according to example embodiments.

Referring to FIG. 2, the controller 100 may include a processing circuitry (such as at least one processor 110), a memory 120, and/or a communication interface 130. The memory 120 may include a volatile memory and/or a nonvolatile memory. The memory 120 may store various special purpose program code including computer executable instructions which may cause the controller 100 to perform the one or more of the methods of the example embodiments. The controller may send and/or receive information to and/or from the e-machine via the communication interface 130.

In an electrification approach of a hydraulic system, such as the hydraulic system 1, hydraulic motor pump 107 is driven by the e-machine 105 and the inverter 103 to improve efficiency.

During conditions like leakage or oil degradation, the e-machine 105 and/or the inverter 103 may be configured to sense and/or identify load variations. For example, the inverter 103 may be configured to estimate torque at the shaft of the e-machine 105. The controller 100 may determine the a load variation signature based on estimated torque. The load variation signatures may be used to distinguish between failures and normal operating conditions. For example, the controller 100 may be configured to distinguish between failures and normal operating conditions of the hydraulic system 1 based on the load variation signatures.

The load variations may include torque variations and/or current variations. The e-machine 105 and/or the inverter 103 may be configured to detect load variations over a wide range in co-ordination with different subsystem controllers which are part of system.

Figure 3:
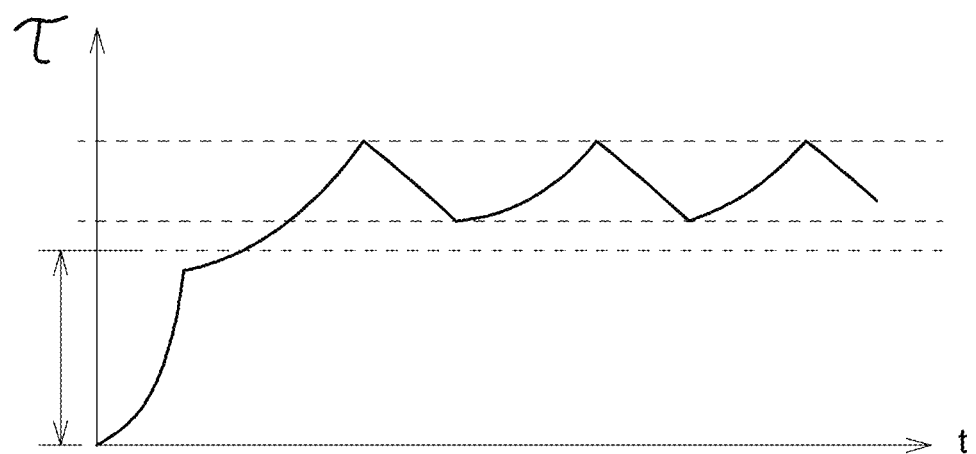
FIG. 3 shows an example graph of a torque profile.

FIG. 3 shows an example graph of a torque profile.

Referring to FIG. 3, the x axis indicates time and the y-axis indicates a torque profile of the shaft of the e-machine 105. Torque at the shaft of the e-machine 105 is proportional to pressure of the hydraulic fluid. Additionally, a motor speed of the e-machine 105 is proportional to a fluid flow of the hydraulic fluid.

Figure 4:
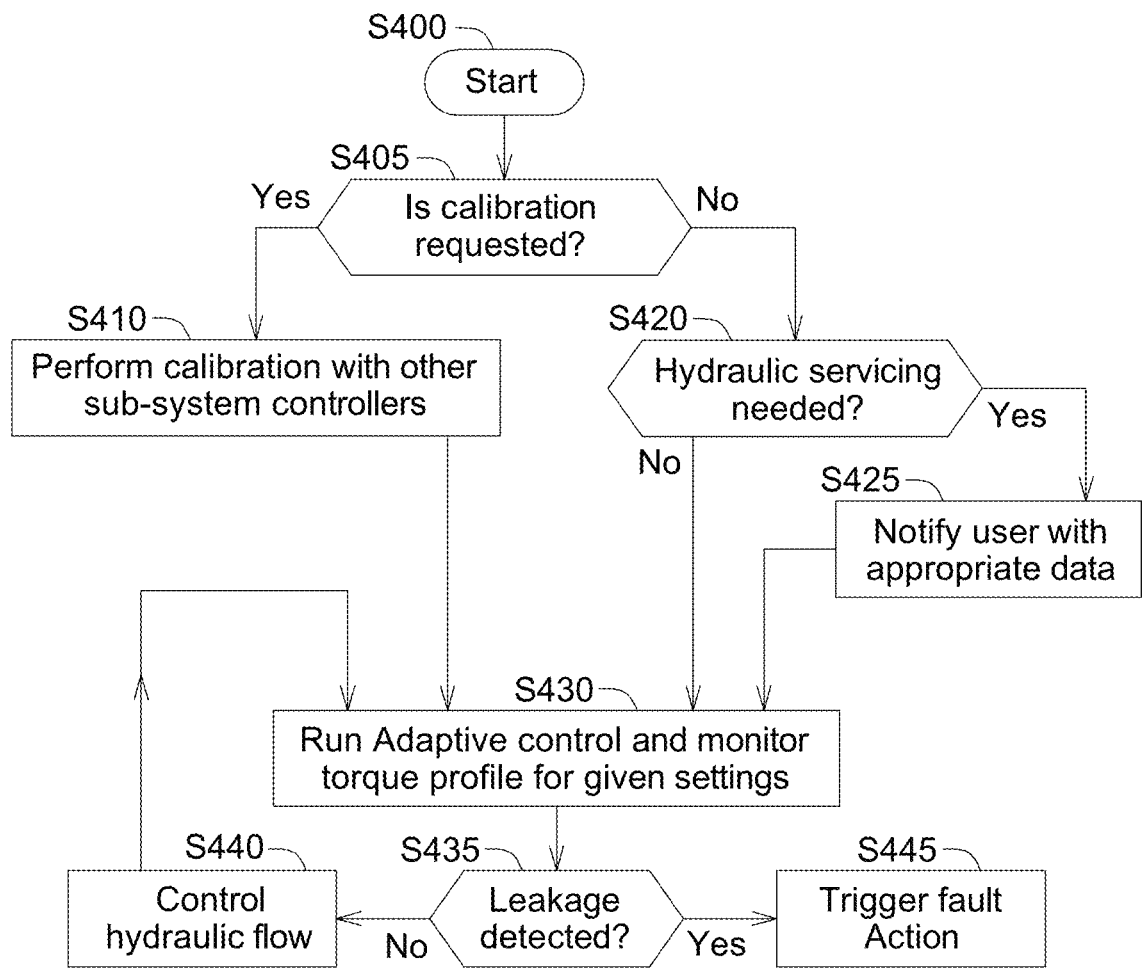
FIG. 4 is a flow chart of a method according to example embodiments.

FIG. 4 is a flow chart of a method according to example embodiments.

For example purposes, the example embodiment shown in FIG. 4 will be discussed with regard to the system shown in FIG. 1. In at least this instance, it is understood that the processor 110 executing program code causes the controller 100 to perform the method of FIG. 4. However, example embodiments should not be limited to this example.

Referring to FIG. 4, the method begins at S400. For example, the controller 100 may begin the method in response to a key on event of the hydraulic system 1. A key on event may refer to a user turning on the hydraulic system 1 or causing the hydraulic system 1 to be turned on.

At S405, the controller 100 determines whether calibration of the hydraulic system 1 is requested. For example, calibration may be requested via a user input. Alternatively, calibration may be performed (requested) in response to calibration not having been previously performed (e.g., a first key on event of the hydraulic system 1). If calibration is requested (Yes as S405), the method proceeds to S410.

At S410, the controller 100 performs calibration of the hydraulic system 1. For example, the controller 100 may communicate with various other sub-system controllers of the hydraulic system 1. Calibration of the hydraulic system 1 may be performed based on a torque profile and/or a current profile of the inverter 101. According to example embodiments, the calibration may be performed without data from sensors external to the inverter 101. The calibration of the hydraulic system 1 will be described in more detail later with regard to FIG. 5.

Once calibration is completed, at S430, the controller 100 starts and runs an adaptive control routine (e.g., an adaptive control algorithm) for monitoring performance of the hydraulic system 1. For example, the adaptive control routine may detect a leakage of hydraulic fluid in the hydraulic system 1. The adaptive control routine may be, for example, a machine learning algorithm.

The adaptive control routine may determine load variations over a wide range in co-ordination with various subsystem controllers included in the hydraulic system 1. Examples of subsystem controllers may include transmission controllers configured to change a transmission state and/or display controllers configured to communicate user commands. The subsystem controllers may be implemented by the controller 100. However, example embodiments are not limited thereto and the subsystem controllers may be implemented by a controller or controllers different from the controller 100.

The range of pressures depend on a type of the hydraulic system 1 (e.g., a vehicle, a tractor, etc.). Different types of the hydraulic system 1 have different maximum pressure capacities. The maximum pressure capacity for the given hydraulic system 1 may be communicated to the inverter 103 via a communication from a vehicle controller unit (VCU). The VCU may act as a primary/supervisory controller and may interact along with other controllers, such as a transmission controller and/or a display controller, etc. The VCU may be implemented by the controller 100. However, example embodiments are not limited thereto and the subsystem controllers may be implemented by a controller or controllers different from the controller 100.

The adaptive control routine may identify torque and/or current variations of the hydraulic system 1 (e.g., torque and/or current variations of the inverter 101), based on the determined load variations.

At S435, the controller 100 determines if there is damage and/or leakage in the hydraulic system 1. The controller 100 may distinguish and/or detect damage and/or leakage in the hydraulic system 1 based on the determined load variations. For example, the controller may compare the determined load variations with calibration values determined at S410.

The calibration values (discussed in more detail below with reference to FIG. 5) may exhibit a gradual decline over time based on a degradation in quality of hydraulic oil. As the controller 100 compares the load variations with the calibration settings, the controller 100 may more accurately determine leakage of the hydraulic system 1 based on a degradation of the hydraulic oil represented by the calibration values.

If the load variation exceeds a threshold difference when compared to the calibration values, the controller 100 may determine that a leakage is detected (Yes at S435) and the method proceeds to S445.

At S445, the controller 100 triggers a fault action. For example, the controller 100 may cause an error message to display to the user and/or the controller 100 may stop operation of the hydraulic system 1.

Returning to S435, if the load variation does not exceed the threshold difference when compared to the calibration values, the controller 100 may determine that a leakage is not detected (No at S435) and the method proceeds to S440.

At S440, the controller 100 operates the hydraulic system 1 to control the hydraulic flow. For example, the controller 100 may operate the normal functioning of the hydraulic system 1.

The method then returns to S430 and continues as discussed herein.

Returning to S405, if calibration is not requested (No as S405), the method proceeds to S420.

At S420, the controller 100 determines whether hydraulic servicing is needed (or recommended) on the hydraulic system 1. For example, the controller 100 may determine whether hydraulic servicing is needed and/or recommended based a degradation determined via a previous calibration. S420 will be described in more detail later with regard to FIG. 6.

If the controller 100 determines that hydraulic servicing is needed and/or recommended (Yes at S420), the method proceeds to S425.

At S425, the controller 100 notifies the user that the hydraulic servicing is needed and/or recommended. For example, the controller 100 may cause an indicator light to turn on and/or the controller may cause a display to display a notification to the user.

The method then proceeds to S430 and continues as discussed herein.

Returning to S420, if the controller 100 determines that hydraulic servicing is not needed and/or not recommended (No at S420), the method proceeds to S430 and continues as discussed herein.

Figure 5:
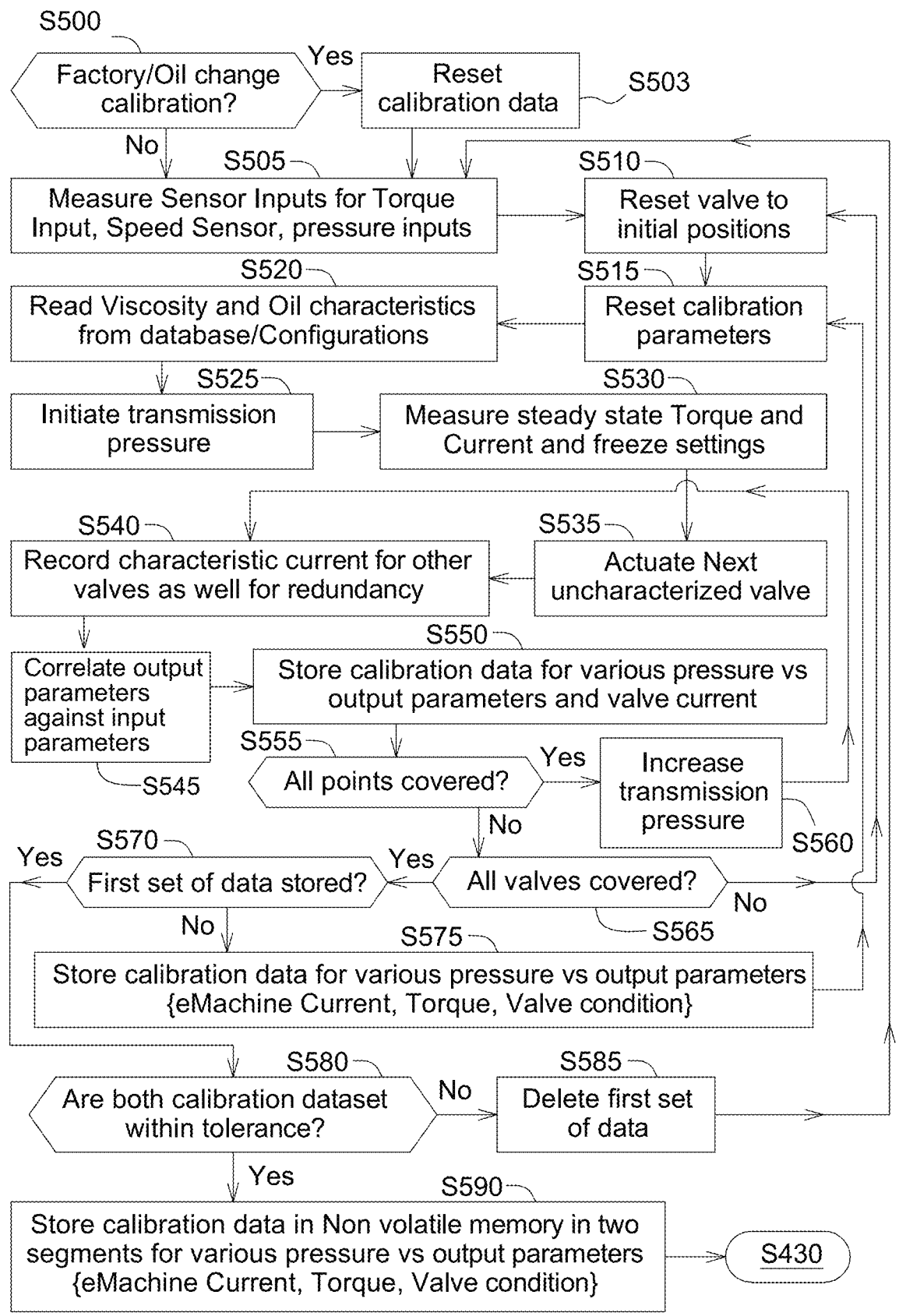
FIG. 5 is a flow chart of a method for performing calibration according to example embodiments.

FIG. 5 is a flow chart of a method for performing calibration according to example embodiments.

For example purposes, the example embodiment shown in FIG. 5 will be discussed with regard to the system shown in FIG. 1. In at least this instance, it is understood that the processor 110 executing program code causes the controller 100 to perform the method of FIG. 5. However, example embodiments should not be limited to this example.

Referring to FIG. 5, at S500 in response to calibration being requested, the controller 100 determines whether an oil change has been performed since the previous calibration request. For example, an oil change may be indicated via a user input.

If the controller determines that an oil change has been performed since the previous calibration request (Yes at S500), then the method proceeds to S503.

At S503, the controller 100 resets calibration data (e.g., first set of data and/or second set of data) stored in the memory 120 to default calibration values. The method proceeds to S505 and continues as discussed herein.

Returning to S500, if the controller determines that an oil change has not been performed since the previous calibration request (No at S500), then the method proceeds to S505.

At S505, the controller 100 measures inputs from I/O sensors at the inverter 103. For example, the controller may receive a value of a torque input, a value of a pressure input, a current value, a voltage value, etc. The controller may receive the values of the inputs from the inverter 103. For example, the controller 100 may not receive values from sensors external to the inverter 103 to perform the calibration. The controller 100 may ensure that all I/O sensors are working and in-range. For example, the controller may determine that a sensor is working if a voltage value reported by a corresponding analog sensor is within predefined (or, alternatively, given) limits. If a sensor is not working, the inverter 103 and/or the controller 100 may report a specific fault to display to the user.

At S510, the controller 100 resets valve drive to initial positions. For example, the controller 100 may instruct a controller of a respective valve to reset the respective valve to an initial position. The initial position of the valve sets the valve to a closed position to stop flow through the valve.

The controllers of the respective valves may be implemented by the controller 100. However, example embodiments are not limited thereto and the controllers of the respective valves may be implemented by a controller or controllers different from the controller 100. the inverter 103 to reset the valves of the valve drive to initial positions.

At S515, the controller 100 resets previous calibration parameters. For example, the controller 100 may reset a variable reflecting calibration parameters for use during the calibration.

At S520, the controller 100 reads viscosity and oil characteristics from a database. For example, the database may be stored in the memory 120. The controller may determine a type of oil in the hydraulic system 1, and read oil characteristics from the database corresponding with the type of oil. The type of oil may be defined (e.g., initially set) according to factory settings. The type of oil may be set and/or changed by a user input. The oil characteristics may include viscosity characteristics, temperature characteristics, etc.

At S525, the controller 100 causes the hydraulic system 1 to initiate a transmission pressure. For example, the controller may cause the inverter 103 to drive the e-machine 105 to cause the hydraulic motor pump to ramp up a hydraulic pressure in the hydraulic system 1.

At S530, the controller determines calibration parameters including a steady state torque, a residual current, and/or a freeze parameter. The controller may determine the calibration parameters based on an adaptive control algorithm. The adaptive control algorithm may correlate the current and torque values measured by the inverter to pressure command and valve states.

At S535, the controller 100 causes the hydraulic system 1 to actuate a next uncharacterized valve of the pump 107.

At S440, the controller 100 records a characteristic current of the other valves not being actuated. This is done to create redundancy in the data collected.

At S545 the controller 100 correlates output parameters against the input parameters. The controller 100 may measure output parameters. For example, the controller 100 may measure a pump speed of the pump 107, an e-machine speed and/or a torque of the e-machine 105, valve states, etc. The output parameters may be correlated to a set of input parameters. For example, the controller 100 may determine what input pressure or valve on/off input caused a variation in the pump speed and/or the torque.

By correlating the output parameters caused by actuation of each valve, the controller 100 may characterize the interdependency of the valves. Characterizing the interdependent valves together with the e-machine 105 may provide a robust and more accurate detection as well as aiding in predicting oil degradation.

At S550, the controller stores calibration data for the various pressure vs. output parameters and a measured current provided to the e-machine 105 from the inverter 101 caused by the actuation of the valve. For example, the controller 100 may store a torque profile and a current profile of the hydraulic system 1 cause by the current pressure of the hydraulic system 1 with the current valve actuated. This calibration data (e.g., the torque profile and current profile) may reflect a primary characterization of independent valve operation.

At S555, the controller determines whether all points (e.g. all possible combinations of valves) have been covered for the current actuated valve. If the controller determines that all points have not been covered for the current actuated valve (No at S555), then the method proceeds to S560.

At S560, the controller causes the hydraulic system to increase the transmission pressure. For example, a step size of pressure may be determined according to a minimum pressure measurable by the hydraulic system 1. The step increase of pressure is used to generate fixed entry data characterization.

The fixed entry data characterization may be used with interpolation to obtain discrete time values. For example, the controller 100 may calculate discrete time values at the start of each step increase in pressure. These values may then be used to calculate the actual pressure gradient between steps (e.g., a rate of change). The method then proceeds to S540 and continues as discussed herein.

Returning to S555, if the controller determines that all points have been covered for the current actuated valve, then the method proceeds to S565.

At S565, the controller 100 determines whether all valves have been covered (e.g., whether all valves have been actuated and calibration data recorded). If the controller 100 determines that all of the valves have not been covered (No at S565), then the method proceeds to S510 and continues as described herein.

If the controller determines that all valves have been covered (Yes at S565), then the method proceeds to S570.

At S570, the controller 100 determines whether a first set of calibration data has been stored for the current calibration. For example, the controller 100 may check the memory 120 for the first set of calibration data. If the controller 100 determines that the first set of calibration data has not been stored (No at S570), then the method proceeds to S575.

At S575, the controller 100 stores the first calibration data in a nonvolatile memory of the memory 120. The first calibration data may be based on the calibration data recorded for each of the valves. The first calibration data may include various pressure vs. output parameters. For example, the first calibration data may include current values of the e-machine 105, torque values of the shaft of the e-machine 105 at the hydraulic pump 107, and/or valve conditions of the valves. For example, data for each step of the valves may be stored as a table and/or as a curve equation based on a computational capacity of the controller 100. The first calibration data may include a torque profile and/or a current profile. The method then proceeds to S515 and continues as described herein.

Returning to S570, if the controller 100 determines that the first set of calibration data has been stored (Yes at S570), then the method proceeds to S580.

At S580, the controller determines whether both of the first calibration data set and a second calibration data set are within a tolerance threshold of each other. For example, the tolerance threshold may be 3%. However, example embodiments are not limited thereto and the tolerance threshold may be greater than or less than 3%. The second calibration data set may be substantially similar to the first calibration data set. Repeated description is therefore omitted. If the first calibration data set and the second calibration data are not within the tolerance threshold of each other (No at S580), then the method proceeds to S585.

At S585, the controller deletes the first calibration data set from the memory 120. The method then proceeds to S505 and continues as discussed herein.

Returning to S580, if the controller determines that the first calibration data set and the second calibration data set are within the tolerance threshold of each other (Yes at S580), then the method proceeds to S590.

At S590, the controller 100 stores the second set of calibration data in the memory 120. Storing the second set of calibration data may be substantially the same as storing the first set of calibration data, described at S575. Repeated description is therefore omitted. The method then proceeds to S430 and continues as discussed herein.

Figure 6:
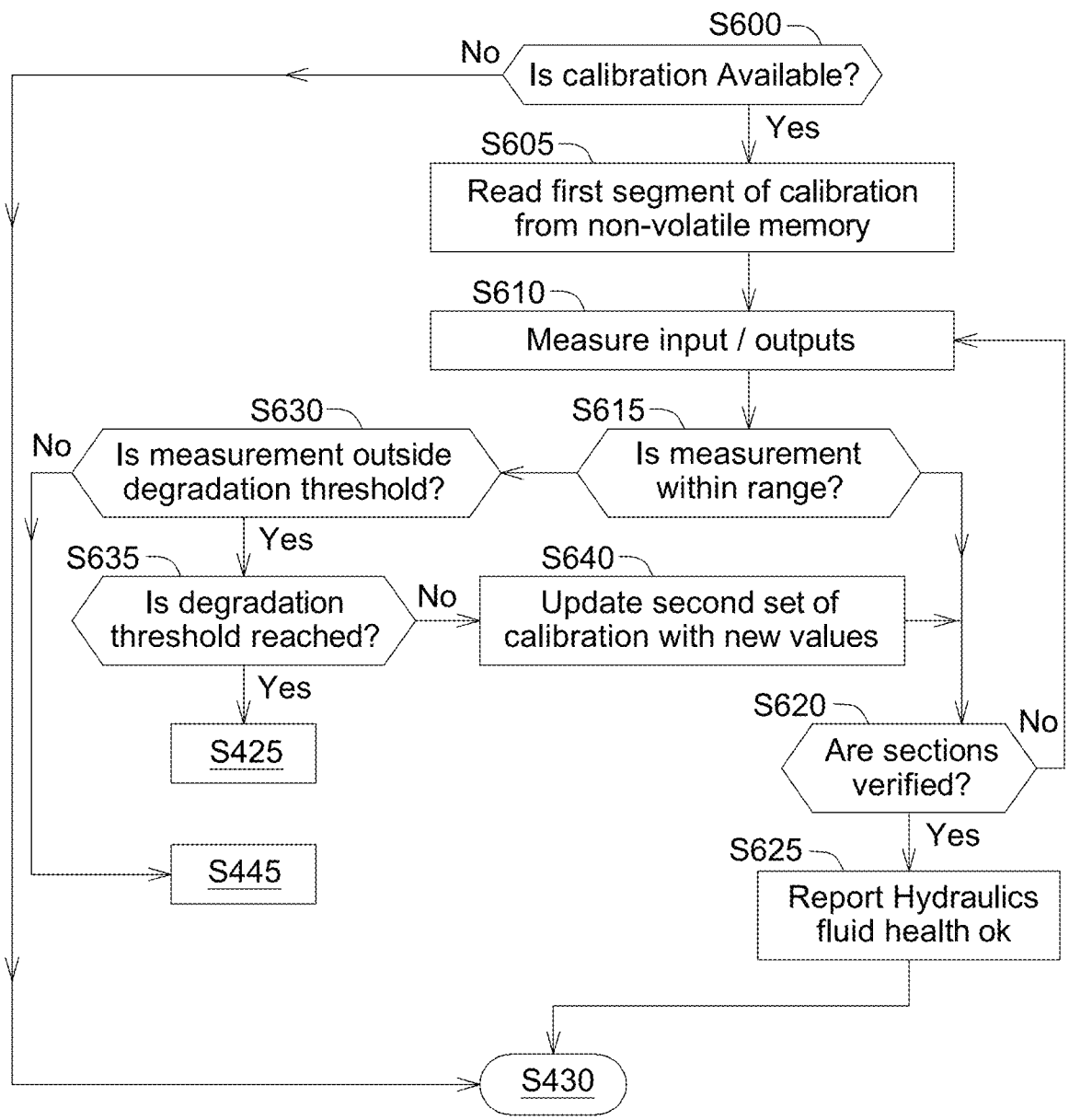
FIG. 6 is a flow chart of a method for determining fluid degradation according to example embodiments.

FIG. 6 is a flow chart of a method for determining fluid degradation according to example embodiments.

For example purposes, the example embodiment shown in FIG. 6 will be discussed with regard to the system shown in FIG. 1. In at least this instance, it is understood that the processor 110 executing program code causes the controller 100 to perform the method of FIG. 6. However, example embodiments should not be limited to this example.

Referring to FIG. 6, at S600 the controller 100 determines whether calibration is available. The controller S600 may determine whether calibration is available by checking the memory 120 for the first set of calibration data and the second set of calibration data. If the first set of calibration data and/or the second set of calibration data is not stored in the memory 120, then the controller 100 determines that the calibration is not available (No at S600), and the method proceeds to S430 and continues as described herein.

If the first set of calibration data and the second set of calibration data is stored in the memory 120 (Yes at S600), then the controller 100 determines that the calibration is available and the method proceeds to S605.

At S605, the controller 100 reads a first segment of calibration from the memory 120. For example, the controller 100 may read the first set of calibration data.

At S610, the controller 100 measures the inputs and/or outputs of the hydraulic system 1. Measuring the inputs and/or outputs of the hydraulic system is described above with regard to S510-S565. Repeated description is therefore omitted.

Different from S565, if the controller 100 determines that all valves are covered (Yes at S565), the method proceeds to S615.

At S615, the controller determines whether the measurement is in range. For example, the controller 100 may compare a third set of calibration data to the first set of calibration data stored in the memory 120. The third set of calibration data may correspond with data that has been stored for the measurements performed at S610.

The controller 100 may determine whether the third set of calibration data is within a threshold range of the first set of calibration data. For example, the controller 100 may compare a torque profile and/or a current profile included in the third set of calibration data with a torque profile and/or current profile included in the first set of calibration data. The controller 100 may determine whether the torque profile and/or the calibration profile of the third set of calibration data is within the threshold range of the first set of calibration data.

For example, a slow variation of the calibration data set over time (e.g., months/days) is expected. A threshold of expected change of the calibration data may be set at X %, where X is dependent upon an oil type. A sudden change of the third set of calibration data vs. the first set of calibration data may be determined as leakage. For example, a sudden change may be determined as more than a 2X % change.

If the third set of calibration data is within the threshold range of the first set of calibration data (Yes at S615), the method proceeds to S620.

At S620, the controller 100 determines whether all sections of the hydraulic system 1 are verified. A determination as to whether all sections of the hydraulic system are verified is described with reference to S555 and S565. Repeated description is therefore omitted. If the controller 100 determines that all sections of the hydraulic system 1 are not verified (No at S620), then the method proceeds to S610 and continues as discussed herein.

If the controller 100 determines that all sections of the hydraulic system 1 are verified (Yes at S620), then the method proceeds to S625.

At S625, the controller 100 reports to a user that the hydraulics fluid health is okay. For example, the controller 100 may cause an indicator light to turn on and/or the controller may cause a display to display a notification to the user. The method then proceeds to S430 and continues as discussed herein.

Returning to S615, if the third set of calibration data is not within the threshold range of the first set of calibration data (No at S615), the method proceeds to S630.

At S630, the controller 100 determines whether the third set of calibration data is outside of a degradation threshold. The degradation threshold may be a predetermined (or alternately given) value based on the hydraulic fluid in the hydraulic system 1. For example, the degradation threshold may be stored in the memory 120 associated with the type of hydraulic fluid. The degradation threshold corresponding with various hydraulic fluid types may be stored in the database in the memory 120. For example, the degradation threshold may be calculated by checking the torque profile with respect to the valve positions and calculating the degradation threshold as a percent of the calibration dataset.

If the third set of calibration data is outside the degradation threshold (Yes at S630), then the controller determines that there is a leak in the hydraulic system 1 and the method proceeds to S445 and continues as discussed herein.

If the third set of calibration data is outside the degradation threshold (Yes at S630), then the method proceeds to S635.

At S635, the controller 100 determines whether a degradation threshold is reached. For example, the controller 100 may determine that the degradation threshold is reached when a percent of the torque profile correlation with a respective valve is less than a predetermined (or, alternately, given) percent of the calibration dataset. For example, the percent of the calibration dataset may be 5%. However, example embodiments are not limited thereto and the percent of the calibration dataset may be greater than or less than 5%.

If the degradation is threshold is reached (Yes at S635), then the controller 100 determines that the hydraulic fluid should be replaced and the method proceeds to S425 and continues as discussed herein.

If the degradation threshold is not reached (No at S635), then the controller determines that the hydraulic fluid should not yet be replaced and the method proceeds to S640.

At S640, the controller 100 updates the second set of calibration data. For example, the controller 100 may replace values stored in the second set of calibration data in the nonvolatile memory of the memory 120 with the values stored in the third set of calibration data. The second set of calibration data may be updated periodically to track gradual change in data set measurement. The second data set may be compared to the first data set to determine oil degradation. The method then proceeds to S620 and continues as discussed herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A device for determining fluid degradation, the device comprising:
   a memory; and
   processing circuitry configured to cause the device to
      characterize an interdependency of a plurality of valves by correlating output parameters, caused by actuation of each valve of the plurality of valves, with input parameters,
      generate first calibration data of an electronic machine (e-machine) at a first time, the first calibration data based on the interdependency of the plurality of valves,
      generate second calibration data of the e-machine at a second time subsequent to the first time,
      determine that the fluid is degraded in response to a difference between the first calibration data and the second calibration data being greater than or equal to a degradation threshold,
      determine that there is a leakage in response to the difference between the first calibration data and the second calibration data being outside of the degradation threshold, and
      stop an operation of a hydraulic system in response to determining that there is a leakage, the hydraulic system including the e-machine.

2. The device of claim 1, wherein the processing circuitry is further configured to cause the device to:
   generate the first calibration data based on at least one of a first current profile of the e-machine or a first torque profile of the e-machine at the first time; and
   generate the second calibration data based on at least one of a second current profile of the e-machine or a second torque profile of the e-machine at the second time.

3. The device of claim 1, wherein the processing circuitry is further configured to cause the device to generate the first calibration data and the second calibration data based on internal readings of the e-machine.

4. The device of claim 1, wherein the processing circuitry is further configured to cause the device to generate the first calibration data and the second calibration data without a sensor external to the e-machine.

5. The device of claim 1, wherein the processing circuitry is further configured to cause the device to:
   generate third calibration data of the e-machine;
   determine whether the third calibration data is within a tolerance threshold of the first calibration data; and
   delete the first calibration data and re-generate the first calibration data in response to determining that the third calibration data is not within the tolerance threshold of the first calibration data.

6. The device of claim 5, wherein the processing circuitry is further configured to cause the device to generate the third calibration data based on at least one of a third current profile of the e-machine or a third torque profile of the e-machine.

7. A system for determining fluid degradation, the system comprising:
   a hydraulic pump;
   an electronic machine (e-machine) configured to drive the hydraulic pump; and
   processing circuitry configured to cause the system to
      characterize an interdependency of a plurality of valves by correlating output parameters, caused by actuation of each valve of the plurality of valves, with input parameters,
      generate first calibration data of an e-machine at a first time, the first calibration data based on the interdependency of the plurality of valves,
      generate second calibration data of the e-machine at a second time subsequent to the first time,
      determine that the fluid is degraded in response to a difference between the first calibration data and the second calibration data being greater than or equal to a degradation threshold,
      determine that there is a leakage in response to the difference between the first calibration data and second calibration data being outside of the degradation threshold,
      stop an operation of a hydraulic system in response to determining that there is a leakage, the hydraulic system including the e-machine.

8. The system of claim 7, wherein the processing circuitry is further configured to cause the system to:
   generate the first calibration data based on at least one of a first current profile of the e-machine or a first torque profile of the e-machine at the first time; and
   generate the second calibration data based on at least one of a second current profile of the e-machine or a second torque profile of the e-machine at the second time.

9. The system of claim 7, wherein the processing circuitry is further configured to cause the system to generate the first calibration data and the second calibration data based on internal readings of the e-machine.

10. The system of claim 7, wherein the processing circuitry is further configured to cause the system to generate the first calibration data and the second calibration data without a sensor external to the e-machine.

11. The system of claim 7, wherein the processing circuitry is further configured to cause the system to:
generate third calibration data of the e-machine;
determine whether the third calibration data is within a tolerance threshold of the first calibration data; and
delete the first calibration data and re-generate the first calibration data in response to determining that the third calibration data is not within the tolerance threshold of the first calibration data.

12. The system of claim 11, wherein the processing circuitry is further configured to cause the system to generate the third calibration data based on at least one of a third current profile of the e-machine or a third torque profile of the e-machine.

13. A method for determining fluid degradation of a hydraulic system, the method comprising:
characterizing an interdependency of a plurality of valves by correlating output parameters, caused by actuation of each valve of the plurality of valves, with input parameters;
generating first calibration data of an electronic machine (e-machine) at a first time, the first calibration data based on the interdependency of the plurality of valves;
generating second calibration data of the e-machine at a second time subsequent to the first time;
determining that the fluid is degraded in response to a difference between the first calibration data and the second calibration data being greater than or equal to a degradation threshold;
determining that there is a leakage in response to the difference between the first calibration data and the second calibration data being outside of the degradation threshold; and
stopping an operation of the hydraulic system in response to determining that there is a leakage.

14. The method of claim 13,
wherein the generating the first calibration data includes generating the first calibration data based on at least one of a first current profile of the e-machine or a first torque profile of the e-machine at the first time, and
wherein the generating the second calibration data includes generating the second calibration data based on at least one of a second current profile of the e-machine or a second torque profile of the e-machine at the second time.

15. The method of claim 13,
wherein the generating the first calibration data includes generating the first calibration data based on internal readings of the e-machine, and
wherein the generating the second calibration data includes generating the second calibration data based on internal readings of the e-machine.

16. The method of claim 13,
wherein the generating the first calibration data includes generating the first calibration data without a sensor external to the e-machine, and
wherein the generating the second calibration data includes generating the second calibration data without a sensor external to the e-machine.

17. The method of claim 13, further comprising:
generating third calibration data of the e-machine;
determining whether the third calibration data is within a tolerance threshold of the first calibration data; and
deleting the first calibration data and re-generating the first calibration data in response to determining that the third calibration data is not within the tolerance threshold of the first calibration data.

18. The method of claim 17, wherein the generating the third calibration data includes generating the third calibration data based on at least one of a third current profile of the e-machine or a third torque profile of the e-machine.

19. A device for determining fluid degradation, the device comprising:
a memory; and
processing circuitry configured to cause the device to
characterize an interdependency of a plurality of valves by correlating output parameters, caused by actuation of each valve of the plurality of valves, with input parameters,
generate first calibration data of an electronic machine (e-machine) at a first time, the interdependency of the plurality of valves and first calibration data based on a first torque profile of the e-machine at the first time,
generate second calibration data of the e-machine at a second time subsequent to the first time, the second calibration data based on a second torque profile of the e-machine at the second time,
determine that the fluid is degraded in response to a difference between the first calibration data and the second calibration data being greater than or equal to a degradation threshold,
determine that there is a leakage in response to the difference between the first calibration data and the second calibration data being outside of the degradation threshold, and
stop an operation of a hydraulic system in response to determining that there is a leakage, the hydraulic system including the e-machine.

* * * * *